(12) United States Patent
Berezecki

(10) Patent No.: US 8,732,371 B2
(45) Date of Patent: May 20, 2014

(54) MANAGING OVERHEAD ASSOCIATED WITH SERVICE REQUESTS VIA SOFTWARE GENERATED INTERRUPTS

(75) Inventor: Mateusz Berezecki, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 369 days.

(21) Appl. No.: 13/217,904

(22) Filed: Aug. 25, 2011

(65) Prior Publication Data

US 2013/0054859 A1 Feb. 28, 2013

(51) Int. Cl.
*G06F 13/26* (2006.01)

(52) U.S. Cl.
USPC .......................................... 710/264; 710/260

(58) Field of Classification Search
USPC ........... 710/260–269, 315, 240–244; 713/174
See application file for complete search history.

(56) References Cited

U.S. PATENT DOCUMENTS

| | | | | | |
|---|---|---|---|---|---|
| 5,303,378 | A | * | 4/1994 | Cohen | 710/264 |
| 6,047,124 | A | * | 4/2000 | Marsland | 717/128 |
| 2006/0248234 | A1 | * | 11/2006 | Pope et al. | 709/250 |
| 2009/0013145 | A1 | * | 1/2009 | Chittigala | 711/170 |
| 2010/0115273 | A1 | * | 5/2010 | Chittigala | 713/164 |

OTHER PUBLICATIONS

"readv(2)—Linux man page: ready, writev—read or write data into multiple buffers," two pages. [Online] [Retrieved Sep. 22, 2011] Retrieved from the Internet <URLhttp://linux.die.net/man/2/readv.>.
"writev(2)—Linux man page ready, writev—read or write data into multiple buffers," two pages. [Online] [Retrieved Sep. 22, 2011] Retrieved from the Internet <URL:http://linux.die.net/man/2/writev.>.

* cited by examiner

*Primary Examiner* — Faisal M Zaman
*Assistant Examiner* — Kim Huynh
(74) *Attorney, Agent, or Firm* — Fenwick & West LLP

(57) ABSTRACT

An application process operates at a privilege level lower than that of the kernel code of the operating system in which the process executes. When the application process requires performance of an operating system service for which the process lacks sufficient privileges to perform directly, rather than repeatedly requesting the service by issuing separate software interrupts, the process instead accumulates the data corresponding to the different service requests in a data container block and defers performance of the service. Whenever the process needs to complete the service, rather than deferring its performance, the process issues a single software interrupt that causes the kernel to use the accumulated data in the data container block to perform each of the N accumulated service requests. This reduces the number of interrupts that must be handled from N to one, thereby greatly reducing the overhead imposed by interrupt handling.

15 Claims, 2 Drawing Sheets

MANAGING OVERHEAD ASSOCIATED WITH SERVICE REQUESTS VIA SOFTWARE GENERATED INTERRUPTS

BACKGROUND

The disclosure herein generally relates to enhancing software application performance within a given operating system environment.

Interrupt-driven processors frequently execute code at different privilege levels, the different privilege levels conveying different permissions to perform operations. For example, the executable code of an operating system, such as the code for the operating system kernel, is typically run at a higher privilege level than the code of ordinary application programs. In this environment, application code or other code running at a lower privilege level may lack sufficient permissions to perform certain operations, such as writing to particular areas of memory (e.g., writing to memory of the network protocol stack for sending a packet). As a consequence, the application code must communicate a request to the code of a high privilege level, such as the operating system kernel code, to perform the operation on its behalf. In order to maintain security, the request must typically be made through some form of gate mechanism—such as an interrupt, or a system call resulting in a software interrupt—that checks the operation to ensure that it does not violate security constraints.

However, the use of software interrupts generated by system calls and other gate mechanisms imposes additional overhead and can lead to significant degradation of performance, and even to lost data. In response to a software interrupt from an application, the operating system must save the state of the application, execute appropriate code to handle the interrupt, and then restore the application state, disabling further interrupt processing while this is taking place. This process can be time-consuming relative to other processing operations and in the aggregate can consume a significant share of the system's processing in a system experiencing frequent interrupts, such as when performing a significant number of I/O operations such as reading from a solid state disk or sending data over a network. Further, since interrupt processing is disabled, if other interrupts occur during interrupt processing the interrupts will not be handled and thus any information associated with the interrupt will be lost.

SUMMARY

An application process operates at a privilege level lower than that of the kernel code of the operating system in which the process executes. When the application process requires performance of an operating system service for which the process lacks sufficient privileges to perform directly, rather than repeatedly requesting the service by issuing separate software interrupts, the process instead accumulates the data corresponding to the different service requests in a data container block and defers performance of the service. Whenever the process needs to complete the service, rather than deferring its performance, the process issues a single software interrupt that causes the kernel to use the accumulated data in the data container block to perform each of the N accumulated service requests. This reduces the number of interrupts that must be handled from N to one, thereby greatly reducing the overhead imposed by interrupt handling.

In one embodiment, the kernel of a conventional operating system is modified to provide additional facilities for performing the interrupt data accumulation and aggregated performance. For example, the API of the operating system or of a programming language may be augmented to provide a function to accumulate the parameter data operated on by a conventional service request system call within the data container block. Thus, the data for multiple service requests may be recorded in the data block. Further, the interrupt handler of the kernel is augmented to include code that reads the data container block and, for each service request instance, transfers control to the code that performs that service request, without issuing any additional software interrupts. Still further, a new system call is provided to issue a single interrupt that transfers control to the augmented portion of the interrupt handler, thereby accomplishing with a single interrupt the functionality of multiple interrupts in the unmodified operating system.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION

Figure 1:
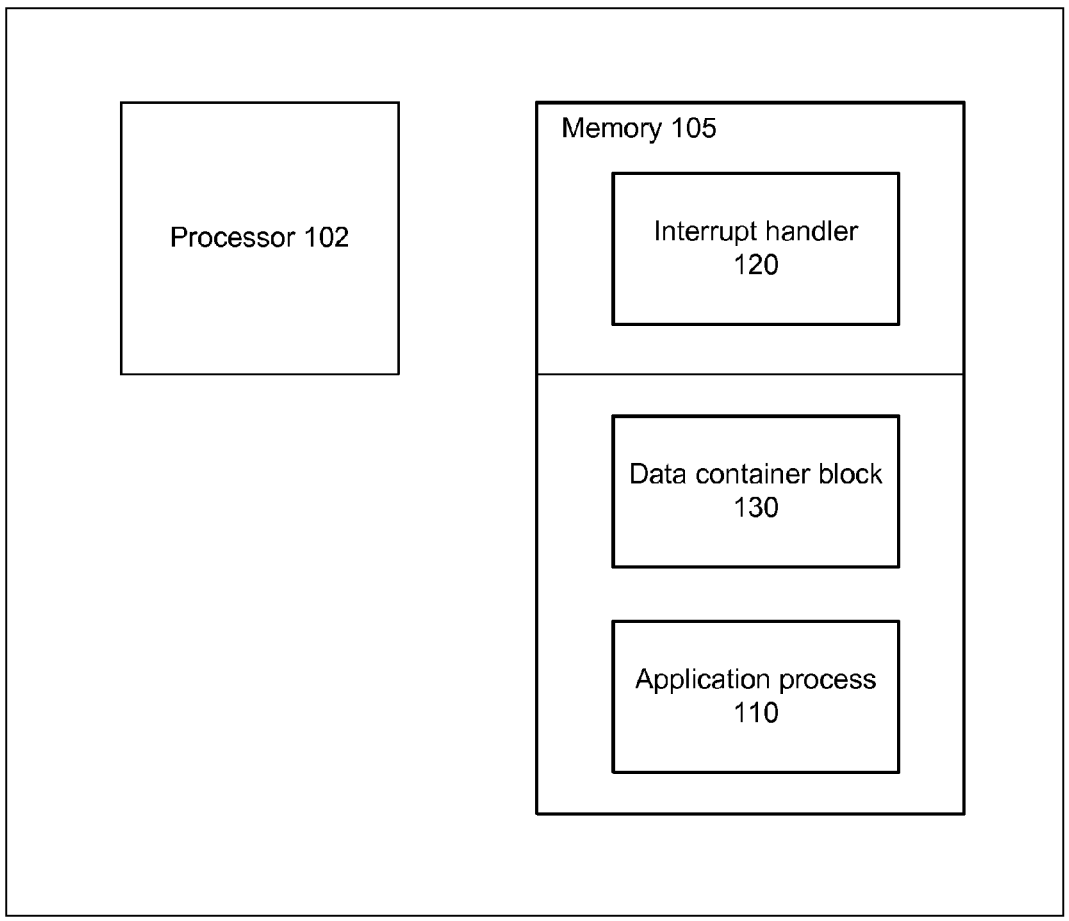
FIG. 1 is a high-level block diagram of a computing system, according to one embodiment.

FIG. 1 is a high-level block diagram of a computing system 100, according to one embodiment. The system 100 may be, for example, a content server system in which a large number of requests to write and/or read data packets or files take place, such as occurs when a remote client of the system requests to see content like images or videos. The system 100 includes at least one processor 102 that executes instructions stored in a memory 105. These components are now described in more detail.

The memory 105 holds instructions and data used by the processor 102. In one embodiment, the memory 105 comprises RAM, such as conventional DRAM or SRAM. An operating system of the system 100 provides that a number of different privilege levels may be associated with resources of the system 100, such as segments of the memory 105.

The processor 102 executes instructions stored in the memory 105, and can be a general-purpose processor such as an INTEL x86-compatible CPU. The processor 102 may include multiple cores, each able to execute instructions in parallel, independent of the other cores. Alternatively and/or additionally, the system 100 may include multiple processors 102.

The processor 102 also supports interrupts. Namely, when the processor 102 receives an interrupt input signal, the processor transfers control to appropriate interrupt handler code of the operating system kernel, changes the current privilege level to the highest level to indicate that the kernel is now executing, disables handling of certain types of interrupts, executes the interrupt handler code, restores the current privilege level to the prior level, re-enables interrupt handling, and returns control to the code that was executing at the time of the interrupt. The processor 102 stores the privilege level of the currently-executing code, which may change between higher and lower privilege level as interrupts occur and are handled.

One type of interrupt results from a system call. The system call is a function called by an application that invokes a particular operating system kernel service. Specifically, the system call function causes a software interrupt and includes as part of the interrupt signal a code indicating the particular kernel service (such as sending a packet) that is requested.

The memory 105 contains executable code implementing an interrupt handler 120 of the kernel of an operating system of the system 100. The interrupt handler 120 performs a service corresponding to the type of interrupt that is triggered, as specified by the interrupt signal received by the processor 102. Specifically, the interrupt signal received by the processor 102 typically includes an interrupt code that specifies the type of interrupt to perform; the processor uses the code to index into a vector of interrupt handlers specified in a privileged portion of the memory 105 and transfer control to the corresponding portion of the interrupt handler 120. The interrupt handler 120 is typically loaded into a segment of the memory 105 having the highest privilege level, thus conferring on the interrupt handler full permissions to access the memory 105 and other system resources.

The memory 105 further contains executable code implementing an application process 110, such as a process for a typical user application. The application process 110 is associated with a lower privilege level than that of the interrupt handler 120. Thus, based on the security rules enforced by the processor 102, the application process 110 may be denied access to certain resources and/or prevented from performing certain operations that the interrupt handler 120 is allowed to access/perform. For example, in order to send a packet over a network, the application process 110 must write the packet data to a segment of the memory 105 belonging to the network protocol stack and having a higher privilege level than that of the application process. However, the hardware security checks of the processor 102 do not permit the application process 110 to write directly into the network protocol stack memory segment, and hence the application process requires the interrupt handler 120 to perform the write on its behalf.

When the application process 110 requires performance of a service—such as a write to a memory segment with a high privilege level—by the interrupt handler 120, performance of the service may be of greater or lesser urgency. For example, the application process 110 may require a result of the service immediately, such as to achieve real-time processing for certain tasks, or further actions of the application process may be dependent upon completion of the service and hence be blocked in the meantime. In such situations, the application process 110 can immediately request performance of the service by issuing a software interrupt (e.g., via a system call) and providing data that the interrupt handler 120 uses to perform the service (e.g., the data of a packet to write to privileged memory). In other cases, however, the requested service does not require immediate performance, and performance of other services is independent of the performance of the requested service. For example, when writing a series of data packets over a network, the data in the packets can be sent independently of each other, and thus the sending of one packet does not depend on the prior sending of another packet to succeed. In these situations, performance of the service can be deferred and combined with other service performances.

The memory 105 further contains a data container block 130 used to combine the data for performing multiple service performances. The data container block 130 stores the argument data corresponding to one or more distinct service requests, each of which would conventionally be provided to the interrupt handler 120 using a separate software interrupt generated by a system call that performs the service. For example, when writing a set of data packets over the network—the writes being independent in that they do not depend on the execution of prior writes to proceed—the data for each individual packet is accumulated within the data container block 130. (The data for each individual packet would conventionally be passed as an argument to the system call, and hence is referred to herein as argument data corresponding to a system call or service request, even though the system call is not directly invoked.) At the end of the accumulation—e.g., after a certain number of service requests have had their argument data stored within the data container block 130, or at the end of a particular logical operation such as the transmission of all data blocks of a file—an interrupt is generated, e.g., by a system call that performs the service. As part of the interrupt, the data container block 130 is provided to the interrupt handler 120, e.g., by passing a pointer to the data container block 130 in one of the registers of the processor 102. The interrupt handler 120 then uses the contents of the data container block 130 to perform the corresponding set of service invocations, without triggering additional software interrupts.

The data container block 130 can be structured in different ways in different embodiments. For example, in one embodiment the data container block 130 begins with an identifier of the type of the requested service, followed by the total number of service requests within the block, followed by the argument data corresponding to each of the service requests in the format expected by the conventional interrupt handler for the given type of interrupt. The identifier of the type of the requested service could be, for example, an integer code, or a pointer to a memory location of code implementing the service. Thus, to carry out the set of service requests in this embodiment, the interrupt handler 120 reads the identifier of the type of service and the total number N of service requests, and then, for each of the N service requests, reads the corresponding service request argument data and transfers control to the portion of the interrupt handler dedicated to processing interrupts of the given type.

It appreciated that the data container block 130 could be structured in a variety of different manners, and need not be structured as described above. For example, the data container block 130 might instead contain a total number of interrupt requests followed, for each interrupt, by an identifier of the type of the service request and the data corresponding to the interrupt request. Such a data format thus permits processing different types of interrupts based on the data container block 130. Additionally, the data container block 130 could have a static location within memory of the operating system kernel and also a fixed size, of which any given set of service requests may use only a part, or the block could be dynamically allocated. Alternatively, the application process 110 can dynamically allocate the block 130 within its own memory, such as allocating the block when the application 110 loads at a single size large enough to accommodate most sets of service requests.

In one embodiment, the logic of when to accumulate service request data within the data container block 130 is specified by the application programmer who authored the code embodied by the application process 120. In this embodiment, the application programmer explicitly invokes code to add argument data for a new service request to the data container block 130, and likewise explicitly invokes code that causes a software interrupt and provides the block 130 to the interrupt handler 120 for processing. For example, to send a file over the network, the application programmer could write, instead of the conventional code:

```
for (i = 0; i < 3; i++)
    send_packet(packet[i]);
``` which results in three separate interrupts due to the three calls, the alternative code:

```
for (i = 0; i < 3; i++) {
    accumulateToBlock(blockAddress, SEND-PACKET-CALL,
        packet[i]);
} processRequests(blockAddress);
``` which results in only one interrupt for the processRequests( ) system call. (In the above hypothetical code, "send_packet (packet[i])" represents a standard system call provided by the operating system and that sends the data represented by "packet[i]". Further, "accumulateToBlock( )" represents a function that adds, to the data container block 130 at memory location "blockAddress", the data "packet[i]"; equivalently, the application programmer could write the data directly to the block without using the "accumulateToBlock( )" convenience function. "packet[i]" is the argument data to be provided as input to the system call corresponding to the identifier "SEND-PACKET-CALL", which could be a function pointer, an index into an interrupt vector, or the like. Finally, "processRequests(blockAddress)" represents a special system call added to the existing conventional operating system functionality. When the "processRequests" function is called, it causes a software interrupt, leading to a portion of the interrupt handler 120 that reads the data container block 130 and directly transfers control to the appropriate portions of the interrupt handler 120 for each service request, as described above. For example, the portion of the interrupt handler 120 to which the "processRequests" function transfers control could perform a "jump" instruction of the processor 102 to directly transfer control to the code implementing the service requests. It is appreciated that these functions and data structures are purely for purpose of example, and that the functions need not have those particular names or arguments, or even be used at all.)

In another embodiment, the logic of when to accumulate service request data is implemented by a modified version of a conventional operating system kernel. Specifically, the augmented kernel includes functionality to recognize a system call and map it—without executing an interrupt—to a corresponding accumulation operation that fills in the data container block 130 and executes the "processRequests( )" at an appropriate point.

Figure 2:
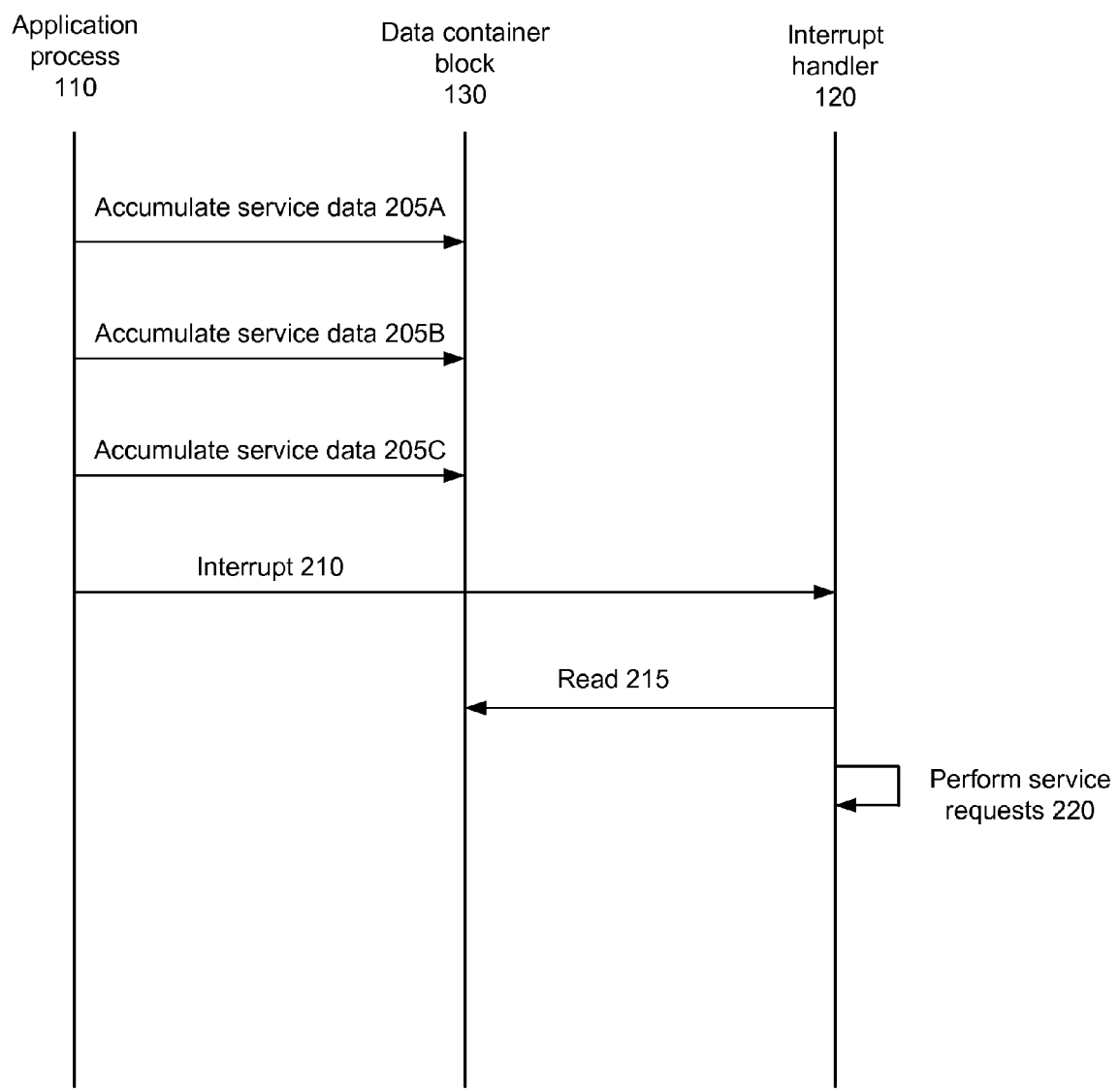
FIG. 2 is an interaction diagram illustrating the interactions of components of the computing environment of FIG. 1 that occur when an application process invokes a service performed by an interrupt handler, according to one embodiment The figures depict embodiments of the present invention for purposes of illustration only. One skilled in the art will readily recognize from the following description that alternative embodiments of the structures and methods illustrated herein may be employed without departing from the principles of the invention described herein.

FIG. 2 is an interaction diagram illustrating the interactions of components of the computing environment of FIG. 1 that occur when the application process 110 invokes a service performed by the interrupt handler 120, according to one embodiment.

In step 205, the application process 110 accumulates 205 argument data, each accumulation corresponding to one request for a service, as described above. For example, each accumulation step could correspond to one explicit call by an application developer to the hypothetical accumulateToBlock( ) function described above. Alternatively, each accumulation step could be implemented by an automatic runtime mapping by a modified version of the operating system kernel from a system call to a corresponding accumulation operation. In general, though only three accumulation steps are depicted in FIG. 2, it is appreciated that there could be any number of them.

In step 210, the application process 110 causes a software interrupt that transfers control to the interrupt handler 120. For example, this might be accomplished using the hypothetical "processRequests( )" system call described above.

In step 215, the interrupt handler 120 reads the data container block 130. Note that since the interrupt handler 120 is part of the kernel and thus has a high privilege level, there are no obstacles to the handler reading the data block 130.

In step 220, the interrupt handler uses the data container block 130. For example, as described above, the interrupt handler 120 might read the total number of requests stored in the data container block 130, then read and appropriately execute each service request (e.g., its type and its argument data). In one embodiment, the different service requests can be distributed by the interrupt handler 120 to multiple processor units, such as multiple processors or multiple cores of the single processor 102, thereby further enhancing performance. In one embodiment, steps 215 and 220 need not be performed in strict serial order; rather, the data for each separate service request can be read 215 and the corresponding service executed 220, in an iterative manner.

Thus, by appropriately modifying a conventional operating system kernel in the ways described above and accumulating service request data in the data container block 130, an application can effectively reduce the number of interrupts required to process a set of N service requests from N interrupts to only one interrupt. This greatly enhances the use of system resources.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

The steps, operations, or processes described herein may be performed or implemented with one or more hardware or software modules, alone or in combination with other devices. In one embodiment, a software module is implemented with a computer program product comprising a computer-readable storage medium containing computer program code, which can be executed by a computer processor for initiating the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
an application process writing, to a data container block in non-kernel memory, argument data corresponding to a plurality of system calls for performing a corresponding plurality of independent service requests, wherein the writing is performed without triggering an interrupt, and wherein the application process lacks a sufficient privilege level to directly write data to operating system kernel memory;
the application process causing a single software interrupt that transfers control to an operating system interrupt handler residing in the operating system kernel memory; and
the interrupt handler performing the plurality of independent service requests based on contents of the data container block, without triggering additional software interrupts following the single software interrupt.

2. The computer-implemented method of claim 1, wherein performing the plurality of independent service requests comprises distributing the service requests to a plurality of processor units for execution.

3. The computer-implemented method of claim 1, wherein none of the plurality of independent service requests depends upon prior execution of other ones of the plurality of independent service requests.

4. The computer-implemented method of claim 1, wherein the interrupt handler invokes functionality of the system calls by jumping, for each of the service requests, to code that performs the service request.

5. The computer-implemented method of claim 4, wherein the data block comprises an identifier of the system calls, and wherein the interrupt handler determines a location of the code to which to jump using the identifier.

6. A computer system comprising:
a computer processor; and
memory comprising:
kernel memory, further comprising an operating system interrupt handler,
an application process lacking a sufficient privilege level to directly write data to the kernel memory, and
a data container block in non-kernel memory;
wherein:
the application process writes, to the data container block, argument data corresponding to a plurality of system calls for performing a corresponding plurality of independent service requests, wherein the writing is performed without triggering an interrupt;
the application process causes a single software interrupt that transfers control to the operating system interrupt handler; and
the interrupt handler performs the plurality of independent service requests based on contents of the data container block, without triggering additional software interrupts following the single software interrupt.

7. The computer system of claim 6, wherein performing the plurality of independent service requests comprises distributing the service requests to a plurality of processor units for execution.

8. The computer system of claim 6, wherein none of the plurality of independent service requests depends upon prior execution of other ones of the plurality of independent service requests.

9. The computer system of claim 6, wherein the interrupt handler invokes functionality of the system calls by jumping, for each of the service requests, to code that performs the service request.

10. The computer system of claim 9, wherein the data block comprises an identifier of the system calls, and wherein the interrupt handler determines a location of the code to which to jump using the identifier.

11. A computer-readable storage medium having executable computer program instructions for an application process and an operating system interrupt handler, the instructions when executed by a processor performing actions comprising:
the application process writing, to a data container block in non-kernel memory, argument data corresponding to a plurality of system calls for performing a corresponding plurality of independent service requests, wherein the writing is performed without triggering an interrupt, and wherein the application process lacks a sufficient privilege level to directly write data to operating system kernel memory;
the application process causing a single software interrupt that transfers control to the interrupt handler, the interrupt handler residing in the operating system kernel memory; and
the interrupt handler performing the plurality of independent service requests based on contents of the data container block, without triggering additional software interrupts following the single software interrupt.

12. The computer-readable storage medium of claim 11, wherein performing the plurality of independent service requests comprises distributing the service requests to a plurality of processor units for execution.

13. The computer-readable storage medium of claim 11, wherein none of the plurality of independent service requests depends upon prior execution of other ones of the plurality of independent service requests.

14. The computer-readable storage medium of claim 11, wherein the interrupt handler invokes functionality of the system calls by jumping, for each of the service requests, to code that performs the service request.

15. The computer-readable storage medium of claim 14, wherein the data block comprises an identifier of the system calls, and wherein the interrupt handler determines a location of the code to which to jump using the identifier.

* * * * *